United States Patent Office 3,351,423
Patented Nov. 7, 1967

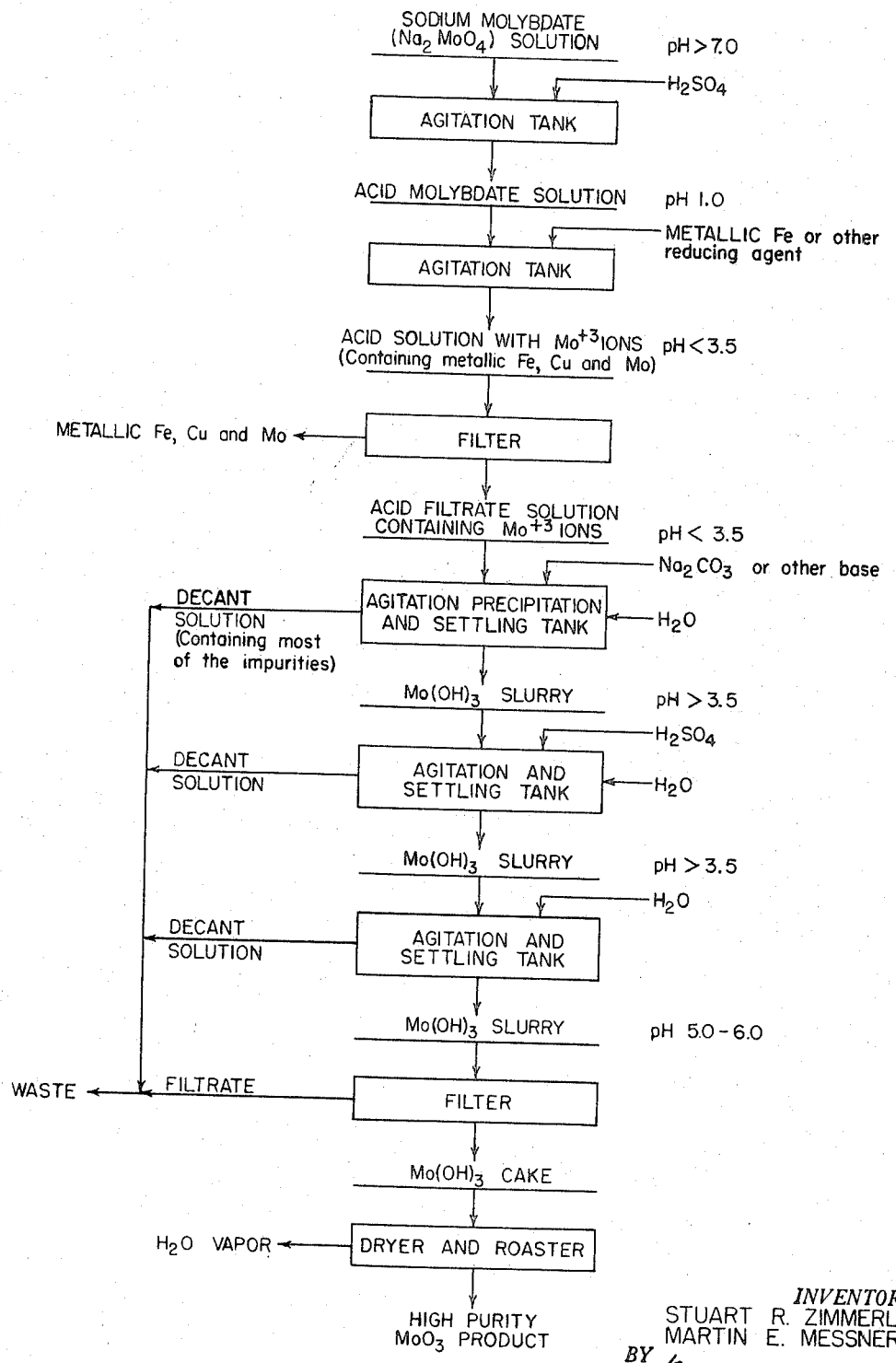

3,351,423
PROCESS FOR PRODUCING MOLYBDIC OXIDE
FROM MOLYBDATE SOLUTIONS
Stuart R. Zimmerley and Martin E. Messner, Salt Lake
City, Utah, assignors to Kennecott Copper Corporation,
New York, N.Y., a corporation of New York
Filed Dec. 9, 1963, Ser. No. 329,095
10 Claims. (Cl. 23—22)

ABSTRACT OF THE DISCLOSURE

A process involving the addition of a reducing agent to a molybdate solution containing impurities, in order to produce molybdic oxide of high purity. If the solution is not already at a pH low enough to remain below 3.5 following the addition of the reducing agent, e.g. a pH of 1.0 when iron is the reductant, a mineral acid is added. Following addition of a reducing agent of kind and in quantity sufficient to reduce the molybdenum to the trivalent state, the pH of the solution is adjusted to precipitate molybdenum hydroxide substantially free of impurities as an intermediate product, which needs only roasting and drying to produce the desired end product, i.e. molydic oxide of high purity.

Summary of the invention

This invention relates to the chemical arts and is concerned with providing an efficient chemical process for producing molybdic oxide—preferably of high purity—from molybdate solutions, such as alkali metal molybdate or complex ammonium molybdate solutions. The invention is particularly applicable to alkali metal molybdate solutions derived from the treatment of ferruginous, molybdenum-bearing slags in accordance with the process disclosed in the copending application for U.S. patent of Stuart R. Zimmerley and Russell R. Beck, Ser. No. 278,096, filed May 6, 1963, entitled, "Process for the Recovery of Molybdenum Values From Ferruginous, Molybdenum-Bearing Slags."

The process described and claimed in that copending patent application enables the recovery, usually in the form of an alkali metal molybdate solution, of most of the molybdenum from a reverberatory slag which contains only a small percentage of molybdenum, for example the production of a sodium molybdate solution containing 92% of the molybdenum and only small amounts of impurities from a reverberatory slag assaying only 0.3% molybdenum. The present process enables such a molybdate solution, in which most of the molybdenum ions present are in a valence state equal to or above plus three, to be economically treated for the production of high purity molybdic oxide, a commercial product in considerable demand. However, other similar molybdate solutions, for example, solutions derived by dissolving various alkali-metal molybdate compounds in water, can also be effectively processed in accordance with the present invention to produce a high purity molybdic oxide. By "high purity" is meant a product which conforms to presently accepted government specifications, i.e. greater than 60% Mo by weight and less than 0.5% Cu, 0.25% $P_2O_5$, and 0.25% $SiO_2$.

A typical alkali-metal molybdate solution resulting from the treatment of a copper reverberatory slag in accordance with the process of the aforementioned copending patent application is a sodium molybdate solution having a pH above 7.0, which contains the following:

| | Grams/liter |
|---|---|
| Molybdenum | 15.0 |
| Copper | 0.05 |
| Iron | 0.05 |
| Arsenic | 0.01 |
| Phosphorous | 0.01 |
| Silicon dioxide | 0.05 | and wherein the molybdenum ions are substantially all in the plus six valence state.

In the making of the present invention, a principal object was to produce high purity molybdic oxide from such a solution.

It is a feature of the invention to reduce the molybdenum ions to the plus three valence state and to then precipitate them as molybdenum hydroxide, substantially free of impurities; also, to remove and reclaim any copper present. The resulting high purity molybdenum hydroxide is easily converted to the desired molybdic oxide end product by merely drying and roasting.

In accordance with the invention, the alkali metal molybdate solution is treated, by the addition of a mineral acid (preferably sulfuric acid, because of the fact that it does not yield impurities, is readily available, is low in cost, and is rapid in its action), to lower its pH to a value sufficiently below 3.5, preferably to pH 1.0, to remain below 3.5 when a reducing agent is added. This produces an acid molybdate solution, as indicated in the flow sheet.

The reducing agent, preferably in the form of a metal, which, in an acid solution, is a stronger reducing agent than plus-three-valence molybdenum, that is, lies above molybdenum in the electromotive series (e.g. iron, zinc, aluminum, magnesium, etc.), is added to the acid molybdate solution. In an acid solution, the plus-three-valence molybdenum ions are essentially stable with respect to their own oxidation and reduction. This is apparent from the following equations (Latimer, W. D., Oxidation Potentials, 2nd Ed., Prentice Hall, New York, 1952), which are presented as illustrations:

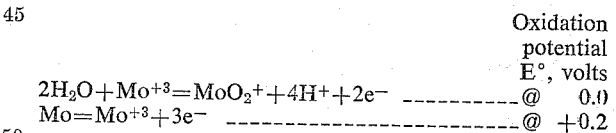

Metallic iron is particularly suited for use as a reducent, because it is powerful enough to reduce the molybdenum ions to a valence of plus three, but, even when added in considerable excess, reduces very little molybdenum below the plus three valence state.

Where metallic iron is the reductant, the following reactions, among others, apparently take place:

(1) $2Mo^{+6} + 3Fe = 3Fe^{+2} + 2Mo^{+3}$
(2) $Mo^{+6} + Fe = Fe^{+3} + Mo^{+3}$
(3) $H_2SO_4 + Fe = FeSO_4 + H_2$
(4) $2Fe^{+3} + Fe = 3Fe^{+2}$
(5) $CuSO_4 + Fe = Cu + FeSO_4$

It should be noted that a significant proportion of the iron reductant added to the acid molybdate solution is dissolved by the $H_2SO_4$, as shown in Equation 3, and will therefore not be available for reduction of molybdenum ions in accordance with reactions 1 and 2. Thus, we have found that, unless acid in excess of that which would ordinarily be expected to be necessary is added to the solution (enough to keep its pH below a value of 3.5 under all circumstances), the pH of the solution will actually increase and will cause molybdenum hydroxide to precipitate, which is undesirable at this stage.

Accordingly, an important feature of the invention is to not only treat an acid molybdate solution with a reducing agent, but to have such solution of appropriately low pH so that molybdenum values will not be precipitated by reason of such reduction step. This is insured by adding sufficient acid to the starting solution to keep its pH at a value preferably below 2.0 when the reducing agent is added. Under all circumstances the pH must be kept below 3.5 if maximum molybdenum recovery is to be obtained from this process. Any mineral acid, preferably sulfuric, may be added to maintain the desired pH during reduction. Adjustment of the starting solution to pH 1.0 is adequate when iron is the metallic reductant, even when there is a very high molybdenum ion concentration, i.e. up to 100 grams per liter.

When iron is the metallic reductant, it should be added in significant excess of that stoichiometrically required to satisfy reaction number 1, i.e. 0.873 lb. of iron per lb. of molybdenum. If this is not observed, all of the molybdenum in solution will not be reduced and will not be precipitated as $Mo(OH)_3$ in subsequent steps. The excess reductant will also precipitate any copper that might be present in the starting solution, as in reaction number 5, and will insure its own presence in solution as ferrous rather than ferric iron, as in reaction number 4. Otherwise, there would be excessive precipitation of ferric sulfate as the pH of the solution increases during addition of the precipitating agent for the molybdenum values. This would contaminate the final product unnecessarily, and would require more decantation purification steps.

In order to raise the pH of the reduced solution and precipitate the molybdenum values as molybdenum hydroxide, a basic material is added. An alkali metal carbonate or hydroxide or ammonium carbonate or hydroxide is best suited for the purpose and is selected from the standpoint of economics in any given instance.

Molybdenum hydroxide begins to precipitate at a pH of 3.6 in the usual molybdate solution (molybdenum in concentration of from about 5 to 20 grams/liter) and at a pH of 3.0 in one of very high molybdenum ion concentration (e.g. 100 grams/liter). Excess iron in the solution causes the reaction to proceed in accordance with reaction numbers 4 and 5 above, thereby precipitating any copper present in the solution and keeping dissolved iron in the ferrous state.

The basic ferrous iron salts will not precipitate in any substantial amount until a pH of 6.5 is reached. Before this, the solution (containing most of the iron as ferrous iron) is decanted, filtered, or otherwise separated from the precipitated molybdenum hydroxide.

It is desirable to add acid to the molybdenum-hydroxide-carrying solution prior to separation of the liquid and solid phases thereof in order to redissolve precipitated iron salts, but care must be taken not to reduce the pH below 3.5. If the pH goes below this point, molybdenum hydroxide will begin to redissolve and will be lost in subsequent decantation operations.

Specific procedures presently regarded as the best mode of carrying out the process in actual commercial practice are illustrated in the accompanying drawing, the single figure of which constitutes a flow sheet.

Referring to the drawing:

In the illustrated instance, the starting or feed material is a sodium molybdate solution derived by treating a copper reverberatory slag in accordance with the process of the afore-referred-to copending application Ser. No. 278,096. Its pH is greater than 7.0, and it contains molybdenum ions which are mostly in a plus six valence state. A small amount of copper values is also present.

This solution is run into an acid-resistant, agitation tank, and sulfuric acid is added until the pH of the solution is adjusted to pH 1.0. Thereupon, the resulting acid molybdate solution is treated, preferably in the same tank, by the addition of metallic iron in excess of the stoichiometric amount necessary for reducing the valence state of the molybdenum ions to plus three. This results in both the desired reduction in valence of the molybdenum ions and the precipitation of copper on the excess iron.

The resulting solution (pH 1.0 to 2.0, depending on the amount of iron) is passed to a suitable filter for removing the solid phase (excess iron reductant metallic copper, and inevitably a small amount of molybdenum) as a cake. The filtrate solution (pH preferably less than 2.5 but necessarily less than 3.5) is passed into a precipitation tank, where water and a base, e.g. sodium carbonate, are added for the purpose of increasing the pH to a value greater than 3.7 so as to precipitate the molybdenum value as molybdenum hydroxide. The sodium carbonate or other base is most effectively added as an aqueous solution, so as to prevent entrapment of solid particles during the molybdenum hydroxide precipitation and to permit closer control of the operation during the precipitation.

Following precipitation and settling of the molybdenum hydroxide, as much of the supernatant solution as possible is removed by decantation and the remaining precipitate slurry is agitated with sulfuric acid and water in order to lower the pH to a value not below 3.5 for the purpose of redissolving any precipitated iron salts. The decanted solution contains most of the impurities (e.g. over 90%) and is sent to waste.

Following re-settling of the precipitated molybdenum hydroxide, the liquid phase is decanted as waste and the remaining molybdenum hydroxide slurry is washed with water in successive steps (not indicated in the flow sheet) to eliminate entrained iron and other impurities.

The washed slurry is filtered, its pH having risen to a value of from 5.0 to 7.0. It is obvious that the greater the number of washing steps, the greater will be the purity of the molybdenum hydroxide product. Ordinarily, two washing cycles will suffice.

The resulting filter cake is molybdenum hydroxide of high purity which only requires drying to remove entrapped water and roasting for from fifteen to thirty minutes at a temperature in the range of 450°–550° C. to yield a high purity molybdic oxide as the final product.

*Example I*

A typical laboratory example of the process, applied to a sodium molybdate solution having a pH of 8.9 and derived in accordance with the procedure shown in the flow sheet of the afore-referred-to patent application Ser. No. 278,096, is as follows:

Five hundred milliliters of the molybdate solution analyzing

| | Grams per liter |
|---|---|
| Mo | 12.72 |
| Cu | 0.04 |
| Fe | 0.02 |
| As | 0.05 |
| P | 0.01 |
| $SiO_2$ | 0.03 |
| S | 0.77 | were treated with concentrated sulfuric acid (S.G.=1.83) in order to lower the pH of the solution to 1.0. A total of 24.75 grams of $H_2SO_4$ were required for this purpose.

If all of the molybdenum ions were present in the solution in their highest valence state, namely +6, a total of 5.6 grams of iron would be necessary for reduction of the molybdenum ions to the +3 valence state according to stoichiometric requirements shown by the following equation:

$$2Mo^{+6} + 3Fe = 3Fe^{+2} + 2Mo^{+3}$$

In order to allow for twenty-five percent excess iron, 9.66 grams of minus 35 mesh sponge iron (containing 77.0 percent total iron and 69.9 percent metallic iron) were added to the solution as a reducing agent. During agitation of this material at 25° C. for one hour, the color of the solution changed from pale yellow to green, then to blue, and, finally, to a dark brown-black, this latter being the color normally associated with acid solutions containing molybdenum in the +3 valence state. The reduction in valence of the molybdenum was accompanied by an increase in the pH of the solution to 1.5.

The solution was then filtered in order to remove the excess reductant, or cement product, which weighed 5.90 grams and which contained 53.2 percent iron and 37.2 percent metallic iron. This cement product also contained 3.71 percent molybdenum, principally as metallic molybdenum, which resulted from some reduction below the desired +3 valence state. The molybdenum contained in the cement product represented only 3.5 percent of that originally reported in the solution.

An aqueous sodium carbonate solution (50 gms. of $Na_2CO_3$/l.) was slowly added to the filtrate to increase the pH and cause precipitation of $Mo(OH)_3$. A flocculating agent (Dow Chemical No. 2610, Seperan) was added at 0.1 gram per 1,000 grams of Mo precipitated in order to aid in $Mo(OH)_3$ flocculation and settling. During the sodium carbonate addition, precipitate formation began at pH 3.6 and was essentially complete at pH 3.7. A very small addition of the $Na_2CO_3$ solution was then made to raise the pH to 5.0 prior to 30 minutes of settling time. A total of 8.49 grams of $Na_2CO_3$ was used for the $Mo(OH)_3$ precipitation, which represented 1.34 gm./gm. of molybdenum originally in solution.

Following 30 minutes of settling, the interface between the settled pulp and the supernatant liquid was at the 400 ml. mark. From the total volume of 1700 ml., 1170 ml. of solution were decanted.

Sufficient tap water was then added to the slurry to bring the total volume back to 1700 ml., after which a very small amount of $H_2SO_4$ (0.2 gm.) was added to lower the pH to 3.5. Following gentle agitation, and with no additional flocculant, the material was again allowed to settle for 30 minutes. The flocculant was not as dense as before and occupied 600 ml. of the 1700 ml. total. The 600 ml. pulp volume represented fifty percent more than in the first 30 minute settling period at pH 5.0 and permitted decantation of 960 ml. of supernatant solution.

Tap water was again added to bring the total volume to 1700 ml. at a pH of 4.1, and, following 30 minutes of settling, the pulp level was at the 500 ml. mark. One-thousand ml. of solution were decanted, and the remaining pulp was filtered and washed with 1000 ml. of tap water. The decant and wash solutions were combined.

The precipitate (filter cake), which consisted principally of $Mo(OH)_3$, was dried at 100° C. for one hour and roasted for 30 minutes at 450° C. The final molybdic oxide product analyzed:

| | Percent |
|---|---|
| $MoO_3$ | 96.20 |
| Mo | 64.10 |
| Fe | 0.79 |
| Cu | .05 |
| As | .03 |
| P | .03 |
| $SiO_2$ | .10 |
| S | .004 |

A metallurgical balance showed the following molybdenum distribution:

| | Percent |
|---|---|
| Final molybdic oxide product | 95.8 |
| Reductant or cement product | 3.5 |
| Decanted solutions (combined) | 0.7 |

*Example II*

A similar laboratory example, utilizing hydrochloric acid instead of sulfuric for pH adjustment, appears below:

Fifteen hundred milliliters of a sodium molybdate solution having a pH of 9.6 and analyzing

| | Grams per liter |
|---|---|
| Mo | 16.1 |
| Cu | 0.01 |
| Fe | 0.05 |
| P | 0.16 |
| $Al_2O_3$ | 0.05 |
| S | 2.32 | were treated with hydrochloric acid (a 3 N solution) to lower the pH to 1.0. A total of 17.4 grams of the HCl were required.

Forty grams of metallic iron (approximately 100% excess over the stoichiometric) were added as a reducing agent to lower the valence state of the soluble molybdenum ions to +3. During the thirty minutes required for reduction to take place, an additional 3.4 grams of the acid were added to maintain the pH of the solution below 3.0. The required valence state was indictaed by the persistence of a dark blue-black color.

Excess iron reductant was removed by filtration, there being carried along with it 0.68 percent of the molybdenum originally in solution. About 0.88 grams of iron per gram of molybdenum were consumed during the reduction operation.

Thirty-seven grams of sodium carbonate, $Na_2CO_3$, were added as a 50 gram/liter solution to increase the pH to 4.5 for molybdenum hydroxide precipitation. The precipitate actually formed at pH=3.6. Ultimate settling was aided by the use of a flocculating agent.

After 30 minutes, the molybdenum hydroxide had settled to a pulp containing 3.89 percent solids. Six liters of solution were decanted. This solution contained 2.78 grams/liter iron and 0.012 gram/liter molybdenum. Water was added to the pulp along with a few drops of hydrochloric acid to lower the pH to 3.5 with agitation. Following 30 minutes of settling, 2.53 liters of solution were decanted. This solution contained a trace of molybdenum and 1.03 gram/liter iron. The operation was repeated, and 3.3 liters of solution were removed by decanting and by filtering. The pulp reached 23.6 percent solids. The final solution contained a trace of molybdenum and 0.29 gram/liter iron.

The filter cake of molybdenum hydroxide was dried at 100° C. for one hour and then roasted at 500° C. in an oxidizing atmosphere for 30 minutes. Analysis of the final molybdic oxide product was as follows:

| | Percent |
|---|---|
| $MoO_3$ | 98.7 |
| Mo | 65.8 |
| Fe | 0.10 |
| Cu | 0.05 |
| P | 0.16 |
| $SiO_2$ | 0.13 |
| S | 0.06 |

A metallurgical balance showed the following molybdenum distribution:

| | Percent |
|---|---|
| Final molybdic oxide product | 99.00 |
| Reductant or cement product | 0.68 |
| Decanted solutions (combined) | 0.32 |

Example III

Another laboratory example, utilizing nitric acid for pH adjustment and ammonium hydroxide as the basic precipitant, was carried out and produced results as follows:

Seven hundred and fifty ml. of a sodium molybdate solution having a pH of 9.0 and analyzing

|     | Grams per liter |
| --- | --- |
| Mo  | 19.6 |
| Fe  | 0.05 |
| Cu  | 0.04 |
| P   | 0.024 |
| $SiO_2$ | 0.07 | were treated with nitric acid (a 2 N solution) to lower the pH to 1.0. A total of 250 ml. of nitric acid were required.

Thirty grams of metallic iron were added as a reducing agent to lower the valence state of the soluble molybdenum ions to +3. During the thirty minutes required for reduction to take place, an additional 75 mls. of the nitric acid solution were added to maintain the pH of the solution below 2.0. The required valence state was again indicated by the persistence of a dark blue-black color.

Excess iron reductant was removed by filtration, there being carried along with it 6.1 percent of the molybdenum originally in solution. About 1.02 grams of iron per gram of molybdenum were consumed during the reduction operation.

Eighty-five mls. of 1 N ammonium hydroxide solution were slowly added to raise the pH of the solution to 5.0 for molybdenum hydroxide precipitation. A dense precipitate began to form at pH=3.5. Settling was permitted for 30 minutes without agitation, followed by decanting of the solution. Water and 1.5 ml. of the nitric acid mixture were then added to lower the pH to 3.5. After 30 minutes of settling time, the solution was decanted and the washing operation repeated a third time. Solution remaining in the settled pulp was removed by filtration and combined with the decanted material. A total of 14.8 percent of the original molybdenum was removed in the solutions. This molybdenum could be recovered through further treatment; however, the percentage going out in the solutions could be reduced by a longer reduction time.

The filter cake of molybdenum hydroxide precipitate was dried at 100° C. for one hour and roasted for 15 minutes at 450° under oxidizing conditions. The final molybdic oxide product had the following analysis:

|     | Percent |
| --- | --- |
| $MoO_3$ | 97.6 |
| Mo  | 65.10 |
| Fe  | 0.44 |
| Cu  | 0.10 |
| P   | 0.04 |
| $SiO_2$ | 0.32 |
| S   | 0.25 |

A metallurgical balance showed the following molybdenum distribution:

|     | Percent |
| --- | --- |
| Final molybdic oxide product | 79.1 |
| Reductant or cement product | 6.1 |
| Decanted solutions (combined) | 14.8 |

Although it is preferred practice to first add the acid and then the reducing agent in the valence reduction of the molybdenum ions, this sequence need not be followed where adequate precautions against premature precipitation of molybdenum hydroxide are taken.

Whereas there are here specifically set forth certain preferred procedures which are presently regarded as the best mode of carying out the invention, it should be understood that various changes may be made and other procedures adopted without departing from the inventive subject matter particularly pointed out and claimed herebelow.

We claim:
1. A process for producing molybdic oxide from molybdate solutions, comprising the steps of
   adding a mineral acid to such a solution in quantity sufficient to adjust its pH far enough below 3.5 to remain below 3.5 when a reducing agent for molybdenum is added;
   introducing into the so-adjusted solution a reducing agent for molybdenum which is stronger, in an acid solution, than plus-three-valence molybdenum, in order to reduce the molybdenum ions to the plus three valence state;
   thereafter adding to the solution a basic material in quantity sufficient to raise the pH to precipitate molybdenum hydroxide;
   separating the precipitated molybdenum hydroxide from the spent solution while maintaining the pH of the solution at at least 3.5 but under about 6.5; and
   drying and roasting the molybdenum hydroxide to produce molybdic oxide.

2. A process for producing molybdic oxide from molybdate solutions, comprising the steps of
   adding a mineral acid to such a solution in quantity sufficient to reduce and maintain its pH below 3.5;
   introducing metallic iron into the so-adjusted solution in quantity sufficient to reduce the molybdenum ions to the plus three valence state;
   thereafter adding to the solution a basic material in quantity sufficient to raise the pH to precipitate molybdenum hydroxide;
   separating the precipitated molybdenum hydroxide from the molybdenum-hydroxide-carrying solution while maintaining the pH of the latter at at least 3.5 but under about 6.5; and
   drying and roasting the molybdenum hydroxide to produce molybdic oxide.

3. A process for producing high purity molybdic oxide from molybdate solutions, comprising the steps of
   adding a mineral acid to such a solution in quantity sufficient to reduce its pH to substantially 1.0;
   introducing into the so-adjusted solution metallic iron in excess of that required to reduce the molybdenum ions to the plus three valence state;
   thereafter adding to the solution a basic material in quantity sufficient to raise the pH to precipitate molybdenum hydroxide;
   separating the precipitated molybdenum hydroxide from the molybdenum-hydroxide-carrying solution while maintaining the pH of the latter at at least 3.5 but under about 6.5;
   washing the precipitated molybdenum hydroxide to eliminate entrained impurities; and
   drying and roasting the molybdenum hydroxide to product molybdic oxide.

4. The process of claim 3, wherein mineral acid is added during the washing of the precipitated molybdenum hydroxide, so as to dissolve entrained impurities.

5. The process of claim 4, wherein a sufficient amount of a mineral acid is added to the precipitated molybdenum hydroxide to redissolve precipitated iron salts and thus facilitate their separation from the molybdenum hydroxide, but not so much acid as to reduce the pH below 3.5.

6. A process for producing molybdenum hydroxide from molybdate solutions, comprising the steps of
   adding a mineral acid to such a solution in quantity sufficient to adjust its pH far enough below 3.5 to remain below 3.5 when a reducing agent for molybdenum employed is added;
   introducing into the so-adjusted solution a reducing agent for molybdenum which is stronger, in an acid solution, than plus-three-valence molybdenum, in order to reduce the molybdenum ions to the plus three valence state;

thereafter adding to the solution a basic material in quantity sufficient to raise the pH to precipitate molybdenum hydroxide; and separating the precepitated molybdenum hydroxide from the spent solution while maintaining the pH of the solution at at least 3.5 but under about 6.5.

7. A process for producing high purity molybdenum hydroxide from molybdate solutions, comprising the steps of adding a mineral acid to such a solution in quantity sufficient to reduce its pH to substantially 1.0;

introducing into the so-adjusted solution metallic iron in excess of that required to reduce the molybdenum ions to the plus three valence state;

thereafter adding to the solution a basic material in quantity sufficient to raise the pH to precipitate molybdenum hydroxide; and separating the precipitated molybdenum hydroxide from the spent solution while maintaining the pH of the solution at at least 3.5 but under about 6.5; and washing the precipitated molybdenum hydroxide to eliminate entrained impurities.

8. A process for producing molybdenum hydroxide from an acid molybdate solution whose pH is sufficiently low to prevent any substantial precipitation of molybdenum values during reduction of molybdenum ions contained in such solution, said process comprising the steps of adding to said solution a reducing agent for molybdenum in quantity sufficient to reduce the molybdenum ions to the trivalent state;

adding to the solution a basic material in quantity sufficient to precipitate molybdenum hydroxide;

and separating the precipitated molybdenum hydroxide from the spent solution while maintaining the pH at at least 3.5 but under about 6.5.

9. In the process of claim 8, drying and roasting the molybdenum hydroxide to produce molybdic oxide.

10. A process for producing molybdenum hydroxide from molybdate solutions, comprising the steps of adding a mineral acid to such a solution in quantity sufficient to reduce and maintain its pH below 3.5;

introducing metallic iron into the so-adjusted solution in quantity sufficient to reduce the molybdenum ions to the plus three valence state;

thereafter adding to the solution a basic material in quantity sufficient to raise the pH to precipitate molybdenum hydroxide; and separating the precipitated molybdenum hydroxide from the molybdenum-hydroxide-carrying solution while maintaining the pH of the latter at at least 3.5 but under about 6.5.

References Cited
UNITED STATES PATENTS 2,017,557   10/1935   Winkler et al. _____ 23—23
2,965,447   12/1960   Zimmerley et al. _____ 23—140

OSCAR R. VERTIZ, *Primary Examiner.*

H. T. CARTER, *Assistant Examiner.*